United States Patent [19]
Oehler et al.

[11] Patent Number: 5,649,748
[45] Date of Patent: Jul. 22, 1997

[54] ELECTROMAGNETICALLY ACTUATED VALVE FOR SLIP-CONTROLLED HYDRAULIC BRAKE SYSTEMS IN MOTOR VEHICLES

[75] Inventors: Martin Oehler, Leingarten; Guenther Hohl, Stuttgart; Norbert Mittwollen, Markgroeningen; Hans-Juergen Herderich, Kernen; Stephan Jonas, Gerlingen, all of Germany

[73] Assignee: Robert Bosch GmbH, Stuttgart, Germany

[21] Appl. No.: 483,418

[22] Filed: Jun. 7, 1995

[30] Foreign Application Priority Data

Sep. 20, 1994 [DE] Germany .................... 43 33 364.1

[51] Int. Cl.$^6$ .................................................. B60T 8/36
[52] U.S. Cl. .................... 303/119.2; 303/87; 251/50; 251/129.02; 251/129.14
[58] Field of Search ..................... 303/87, 119.2; 251/50, 129.02, 129.14

[56] References Cited

U.S. PATENT DOCUMENTS

| | | | |
|---|---|---|---|
| 3,829,060 | 8/1974 | von Lewis | 251/129.02 |
| 5,076,538 | 12/1991 | Mohr et al. | 303/119.2 |
| 5,167,442 | 12/1992 | Alaze et al. | 251/129.02 |
| 5,370,450 | 12/1994 | Volz et al. | 303/119.2 |
| 5,476,243 | 12/1995 | Gehler et al. | 251/129.02 |

FOREIGN PATENT DOCUMENTS 3934771  3/1991  Germany .

Primary Examiner—Robert J. Oberleitner
Assistant Examiner—Chris Schwartz
Attorney, Agent, or Firm—Edwin E. Greigg; Ronald E. Greigg

[57] ABSTRACT

[The aim is to] A solenoid valve which achieves a setting of a reduced flow area which is active after a closed position of the valve is disclosed. The solenoid valve has a seat valve in a valve chamber. A magnet armature for actuating the seat valve is provided on its end face remote from the seat valve with an axially expandable hollow part whose interior, acting as a control chamber, is connected to a valve sub chamber through a pressure fluid channel. A [D]dynamic pressure is generated in the partly open position of the seat valve in the valve subchamber and is capable through expansion of the hollow part in the control chamber of causing a force which acts on the magnet armature against the force of a resetting spring and on the basis of which the seat valve maintains its partly open position. The valve can be used in slip-controlled hydraulic brake systems of motor vehicles.

4 Claims, 2 Drawing Sheets

ELECTROMAGNETICALLY ACTUATED VALVE FOR SLIP-CONTROLLED HYDRAULIC BRAKE SYSTEMS IN MOTOR VEHICLES

PRIOR ART

The invention proceeds form an electromagnetically actuated valve as defined hereinafter.

Such a valve is disclosed in DE 39 34 771 C1, FIG. 3. It has a control piston which is arranged in the valve dome, forms a stop for the magnet armature, and is guided longitudinally displaceably on a pin which projects from the valve body of the seat valve and penetrates the magnet armature. With its base, which is averted from the armature, the control piston bounds a control chamber which is connected by means of a pressure fluid channel penetrating the pin and the control piston along the same axis to the pressure fluid inlet of the known valve. While the magnet armature is pressure-compensated at both end faces, pressure introduced into the control chamber is capable of displacing the control piston axially against a stop. As a result, the stroke of the magnet armature is reduced by a predetermined amount, resulting in a restriction of the flow area of the seat valve.

This mode of operation of the known valve is usable in slip-controlled hydraulic brake systems in which the pressure fluid inlet is connected to a master brake cylinder and the pressure fluid outlet is connected to a wheel brake cylinder. If, for example, in the case of brake slip control the valve is switched into its closed position by exciting the solenoid and generates in conjunction with the reduction in the pressure in the wheel brake cylinder a pressure gradient of sufficient intensity between the pressure fluid inlet and the pressure fluid outlet, this effects the displacement described above of the control piston, with the result that upon opening of the valve the abovementioned restriction of the flow area becomes active as long as the pressure difference exists between the inlet and outlet. Because of the reduced pressure gradient, in the case of a pressure build up of a brake slip control following a pressure reduction, the reduction in the flow area has a favorable effect on the control quality and the noise response of the brake system. In the case of normal braking without the risk of locking, by contrast, the full flow area of the valve is available, and this promotes a sought short after response time of the brake system when the brakes are actuated.

In the case of the known valves, however, the fixed setting of the restricted flow area is disadvantageous, because the flow rate is hereby subjected to fluctuations which are a function of the differential pressure. Moreover, the flow rate is very much a function of the absolute dimension of the flow area, that is to say the stop requires a very narrow tolerance.

ADVANTAGES OF THE INVENTION

The solenoid valve according to the invention has, by contrast, the advantage that after the seat valve has opened from the closed position its flow area is set to largely constant flow rates because of the pressure in the valve subchamber, which is transmitted through the first pressure fluid channel into the hollow part, with the result that the latter expands axially and causes a force against the hydraulic opening force and the force of the resetting spring which subjects the magnet armature in a partly open position of the seat valve to an equilibrium of forces which stabilizes the position. Since the pressure fluid at higher pressure is located inside the hollow part, there is no need for a seal on the circumferential side of the magnet armature in the valve dome in order to separate the two armature end faces in terms of pressure.

BRIEF DESCRIPTION OF THE DRAWINGS

An exemplary embodiment of the invention is represented in a simplified way in the drawing and explained in more detail hereinafter.

DESCRIPTION OF THE EXEMPLARY EMBODIMENT

Figure 1:
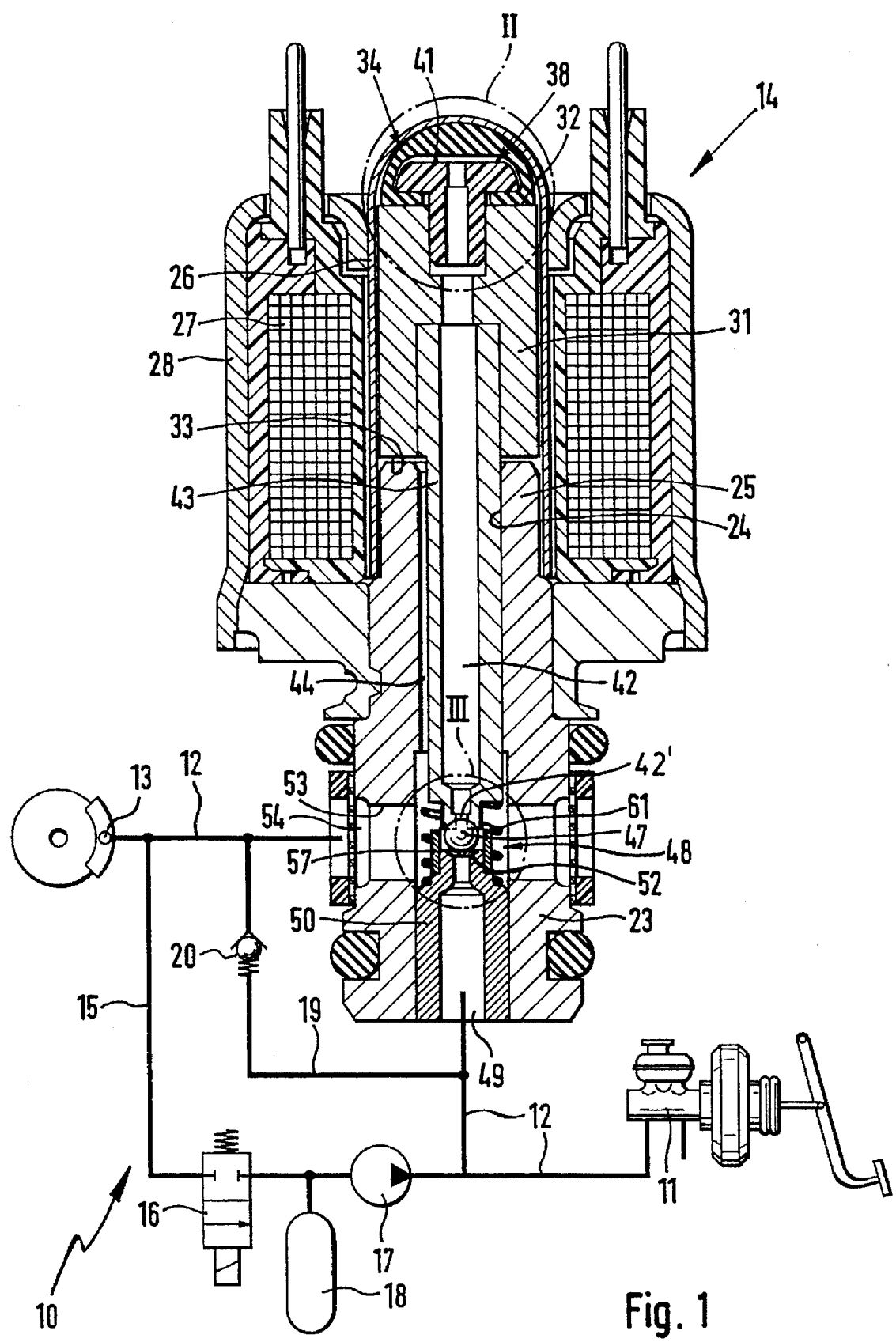
FIGS. 1 shows a longitudinal section through an electromagnetically actuated valve in a diagrammatically indicated brake system of a motor vehicle.

A brake-slip controlled hydraulic brake system 10 of a motor vehicle, which is reproduced in a very simplified fashion in FIG. 1, has a dual circuit master brake cylinder 11 from which a brake line 12 issues to a wheel brake cylinder 13. Arranged in the course of the brake line 12 is an electromagnetically actuated valve 14 which acts as an inlet valve in the case of slip control. Issuing on the wheel brake cylinder side from the brake line 12 is a return line 15 which bypasses the valve 14 and is connected to the brake line on the master brake cylinder side. Located in the return line 15 are an outlet valve 16 and a return conveyor pump 17 for the pressure fluid extracted from the wheel brake cylinder 13. A storage chamber 18 is connected to the return line 15 between the outlet valve 16 and the return conveyor pump 17. In addition, provision is made of a bypass line 19, which bypasses the solenoid valve 14, having a nonreturn valve 20 which opens in the direction from the wheel brake cylinder 13 to the master brake cylinder 11.

The solenoid valve 14 has a housing 23 with a through-bore 24. A sleeve-shaped valve dome 26 having a hemispherical closure is plugged onto a pole core 25, formed from the housing 23, and connected in a pressure-tight fashion to the pole core. The valve dome 26 is surrounded by an annular solenoid 27 having a bell-shaped housing 28.

Figure 2:
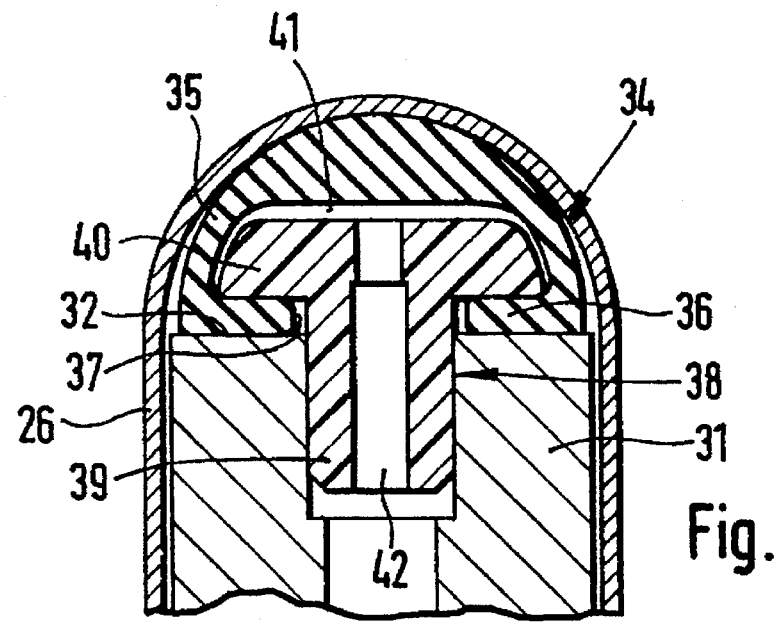
FIG. 2 shows the region denoted by II in FIG. 1 and having a hollow part between a magnet armature and a valve dome.

An essentially circular cylindrical magnet armature 31 is accommodated in a longitudinally movable fashion in the valve dome 26. The magnet armature has two end faces 32 and 33 extending at right angles to its longitudinal axis. Arranged on the end face 32 of the magnet armature 31 remote from the pole core is a hollow part 34 which is made from an elastomeric material and is adapted to the contour of the closure cap of the valve dome 26, that is to say largely fills up the latter. The hollow part 34 is constructed against the valve dome 26 with a hemispherical wall 35 and has on the magnet armature side a radially extending base 36 with a central opening 37 (FIG. 2). A longitudinally bored bolt 38 is provided for the purpose of fastening the hollow part 34 to the magnet armature 31. The bolt 38 has a pin part 39, pressed into the longitudinally bored magnet armature 31, and a head part 40 which is accommodated in the interior of the hollow part and which overlaps the base 36 and keeps the base bearing tightly against the end face 32 of the magnet armature 31. The interior of the hollow part 34 forms a control chamber 41 into which a first pressure fluid channel 42 opens. The latter extends through the bolt 38, the magnet armature 31 and a tappet 43, which is firmly connected to the or nature 31 with the same axis and is accommodated in the housing bore 24 with a slight radial play. A second pressure fluid channel 44, which is formed on the circumferential side of the tappet 43 by a flat surface of the tappet leads to the end face 33 of the magnet armature 31 near the pole core. The magnet armature 31 and the hollow part 34 are washed around on the outside by pressure fluid, since the magnet armature 31 is not sealed on the circumferential side with respect to the valve dome 26.

Figure 3:
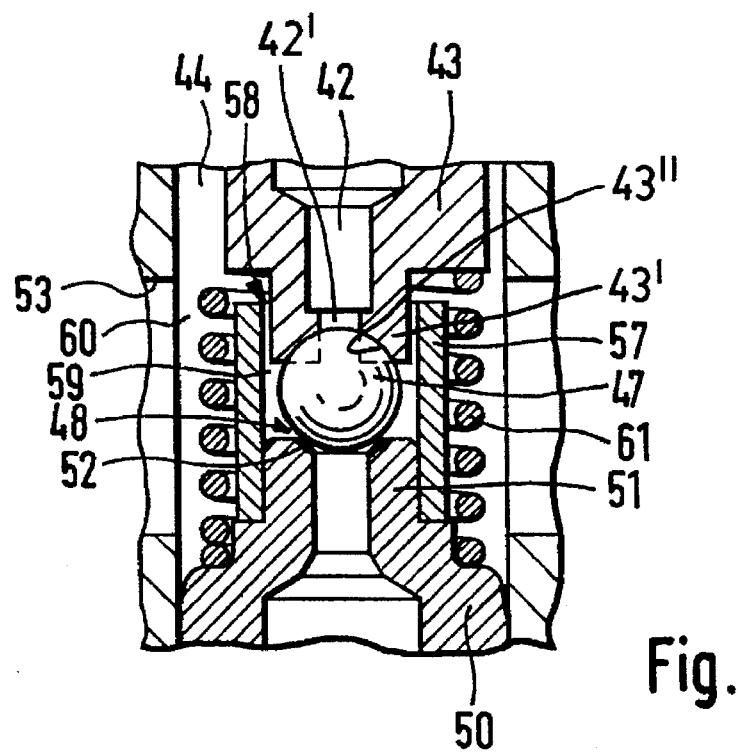
FIG. 3 shows the region, marked by III in FIG. 1, having the seat valve in a partly open position.

As FIGS. 1 and 3 show, the tappet 43 carries on its end 43 directed away from the armature, a closing element 47, constructed in the form of a ball, of a seat valve 48 in the form of the 2/2 way valve. A crosswise slit 42' is formed between the end of the tappet 43 and the closing element 47. The closing element 47, configured as a whole ball in the exemplary embodiment, is connected to the end 43' directed away tappet 43 by bonding 43". A valve body 50 is pressed in from that side of the housing bore 24 which forms a pressure fluid inlet 49 of the solenoid valve 14 and which is spaced from the armature. The longitudinally bored valve body 50 is provided on the end toward the tappet with a pin-shaped neck 51 on which a valve seat 52 is formed in the shape of a hollow cone. In the region of the seat valve 48, the housing bore 24 is crossed by a transverse bore 53 which forms a pressure fluid outlet 54 connected to the wheel brake cylinder 13 through the brake line 12.

The seat valve 48 is surrounded by a straight, hollow cylindrical sleeve 57. The latter is fastened in a sealed fashion and spaced from the end of the tappet to the neck 51 of the valve body 50. In the closed position of the seat valve 48 and in the partly open position reproduced in FIG. 3, the tappet 43 extends into an end of the sleeve 57 while forming a radial gap 58. This gap 58 acts as a restricting point between a valve subchamber 59, situated inside the sleeve 57, and a valve chamber 60 which is located outside the sleeve and is connected to the pressure fluid outlet 54 (FIG. 3). The valve subchamber 59 situated directly on the outlet side of the seat valve 48 is connected to the first pressure fluid channel 42 via the slit 42', whereas the valve chamber 60 is connected to the second pressure fluid channel 44. Finally, a preloaded resetting spring 61 is also provided which surrounds the sleeve 57, is supported on the valve body 50, on the one hand, and on the tappet 43, on the other hand, and holds the seat valve 48 in the open position when the solenoid 27 is not excited.

The mode of operation of the solenoid valve 14 is as follows:

When braking is initiated without the risk of locking by the vehicle driver, the valve 14 assumes its neutral position, that is to say the seat valve 48 is located in its open position shown in FIG. 1. The pressure generated by actuating the master brake cylinder 11 effects a rise in pressure in the wheel brake cylinder 13 by displacing partial quantities of pressure fluid in the brake line 12. In this case, the path of the pressure fluid is from the pressure fluid inlet 49 through the valve body 50 and the valve seat 52 of the seat valve 48 and, further, from the valve subchamber 59 into the valve chamber 60 and through the transverse bore 53 to the pressure fluid outlet 54. The pressure fluid flow through the solenoid valve is not restricted in this case, since the tappet 43 does not dip into the sleeve 57. If the driver decreases the brake pressure or if he terminates braking, the path of the pressure fluid is in the reverse flow direction through the seat valve 48 and, as the case may be, through the parallel-connected nonreturn valve 20 in the bypass line 19.

In the event of braking with a risk of locking, the solenoid valve 14 is switched by excitation of the solenoid 27 into the working position, in which the seat valve 48 is transferred into the closed position by displacement of the magnet armature 31 against the force of the resetting spring 61. At the same time, the outlet valve 16 in the return line 15 is switched into the fluid passing position and the return conveyor pump 17 is set in operation. By extracting partial quantities of pressure fluid from the wheel brake cylinder 13 and conveying it back to the master brake cylinder 11, pressure is reduced on the wheel brake side and the risk of locking is reduced. In the phase, following a reduction in pressure, for maintaining pressure in the wheel brake cylinder 13, the solenoid valve 14 remains in the working position, while the outlet valve 16 in the return line 15 is switched into the closed position.

For the pressure build-up in the wheel brake cylinder 13 following pressure maintenance, the outlet valve 16 maintains its closed position and the solenoid valve 14 is no longer energized. Because of the lack of excitation of the solenoid 27, the magnet armature 31 is displaced longitudinally by means of the pressure generated by the master brake cylinder 11 onto the closing element 47, and the force of the resetting spring 61 is longitudinally displaced in the direction of the closure cap of the valve dome 26. Pressure fluid flows through the opening seat valve 48 from the outlet thereof into the valve subchamber 59 and further through the gap 58 between the tappet 43 and the sleeve 57 into the valve chamber 60 to the pressure fluid outlet 54. Because of the restricting effect of the gap 58, a dynamic pressure occurs in the valve subchamber 59, acting as a ram which applies a lifting pressure on the end of the tappet, and is transmitted through the slit 42' to the first pressure fluid channel 42 and into the control chamber 41 of the hollow part 34. The pressure which is lower due to the pressure drop at the restricting point in the valve chamber 60 passes, by contrast, through the second pressure fluid channel 44 to the outside of the magnet armature 31 and of the hollow part 34. The higher pressure in the control chamber 41 effects an axial expansion of the hollow part 34, with the result that the wall 35 thereof is supported on the cap-shaped closure of the valve dome 26. As a result, the pressure fluid in the control chamber 41 of the hollow part 34, which acts on the magnet armature 31, on the one hand, and on the valve dome 26, on the other hand, is capable of exercizing a force on the magnet armature 31 which is directed against the hydraulic opening force on the closing element 47 of the seat valve 48 as well as against the force of the resetting spring 61. These forces compensate one another in a partly open position of the seat valve 48 in which largely constant flow rates of the pressure fluid, which are very much lower by comparison with the open position of the seat valve, now flow from the pressure fluid inlet 49 to the pressure fluid outlet 54 of the solenoid valve 14. The solenoid valve 14 therefore acts in this partly open position as a flow control valve.

In the further course of the brake slip control, the solenoid valve 14 is switched in rapid succession by renewed excitation of the solenoid 27 into the closed position of the seat valve 48 and, by switching off the excitation, into the previously described partly open position. With increasing equalization of the pressure in the wheel brake cylinder 13 to the pressure of the main brake cylinder 11, the dynamic pressure in the valve subchamber 59 is reduced, with the result that the hydraulic opening force on the closing element 47 and the spring force of the resetting spring 61 ultimately predominate over the oppositely directed force on the magnet armature 31 and transfer the seat valve 48 into the open position, in which the control chamber 41 assumes its minimum volume by stoppage of the hollow part 34 on the cap-shaped closure of the valve dome 26. It is now possible for the pressure fluid to flow without restriction through the solenoid valve 14.

The foregoing relates to preferred exemplary embodiments of the invention, it being understood that other variants and embodiments thereof are possible within the spirit and scope of the invention, the latter being defined by the appended claims.

We claim:

1. An electromagnetically actuated solenoid valve (14), for slip-controlled hydraulic brake systems (10) in motor vehicles, which comprises:

a housing (23), a valve dome extending from said housing, a magnet armature (31) encircled by pressure fluid is accommodated in a longitudinally movable fashion in said valve dome (26), a solenoid (27) surrounds the valve dome (26), a tappet (43) includes a closing element (47) of a seat valve (48) which is arranged in a housing bore (24) of the solenoid valve (14) that leads from a pressure fluid inlet (49), a resetting spring (61) is positioned between said tappet and said seat valve, when the solenoid (27) is not excited, the seat valve (48) assumes an open position because of an effect of said resetting spring (61) which is positioned between said tappet and said seat valve, the seat valve (48) is located in a valve chamber (60) which is connected to a pressure fluid outlet (54) of the solenoid valve (14), the valve chamber has a valve subchamber (59) which acts as a ram under pressure and from which a first pressure fluid channel (42) extends to a control chamber (41) located on a side of the magnet armature (31) remote from the seat valve, a second pressure fluid channel (44) extends from the valve chamber (60) near the seat valve to an end face (33) of the magnet armature (31), pressure generated in the valve subchamber (59) is capable of causing a pressure force in the control chamber (41) which acts on the magnet armature (31) against a force of the resetting spring (61), because the seat valve (48) assumes a partly closed position deviating from an open position of the seat valve (48), and the control chamber (41) is located in an axially expandable hollow part (34) which includes fluid under pressure that acts on the magnet armature (31) and on the valve dome (26).

2. The valve as claimed in claim 1, wherein the hollow part (34) is fastened tightly to an end face (32) of the magnet armature (31) remote from the seat valve, the hollow part (34) is adapted to the contour of the valve dome (26) and is connected with its interior to the first pressure fluid channel (42).

3. The valve as claimed in claim 2, wherein the hollow part (34) is constructed in a hemispherical fashion against the valve dome (26) and has a radially extending base (36) on a magnet armature side with a central opening (37) through which a longitudinal bolt (38) engages with a pin part (39) fastened in the magnet armature (31), while a head part (40), accommodated in the interior of the hollow part, overlaps the base and holds the base bearing tightly against the end face (32) of the magnet armature.

4. The valve as claimed in claim 1, wherein the hollow part (34) consists of an elastomeric material.

* * * * *